United States Patent Office 3,401,121
Patented Sept. 10, 1968

3,401,121
PROCESS FOR PREPARING MOLECULAR SIEVES
Curtis H. Elliott, Jr., Baltimore, Md., assignor to W. R. Grace & Co., New York, N.Y., a corporation of Connecticut
No Drawing. Filed Oct. 21, 1965, Ser. No. 500,295
4 Claims. (Cl. 252—184)

ABSTRACT OF THE DISCLOSURE

A method for preparing molecular sieves wherein excess alkaline reactants are removed by washing a molecular sieve reaction slurry with an aqueous solution of an alkali metal bicarbonate. This washing procedure efficiently reduces the pH of the molecular sieve slurry and enhances the filtration characteristics thereof.

---

This invention relates to a method of preparing molecular sieves. In one specific embodiment, it relates to removal of excess alkaline reactants from the reactant mixture used to prepare the molecular sieves.

The crystalline zeolites, known as molecular sieves, are prepared from the reaction of concentrated sodium hydroxide solution, a source of silica such as sodium silicate, for example, and an alumina source. In one of the preferred processes for preparing these materials a solution of sodium hydroxide is prepared and used to treat clay. The clay furnishes the silica and alumina components for the preparation of the zeolite. In all of these processes, the ratio of reactants and the reaction conditions such as aging and crystallization time, for example, determines the structure of the final product.

The molecular sieve designated type A zeolite by the Linde Division of Union Carbide Corp. has a silica to alumina ratio of about 2 and is the least difficult to prepare. The zeolites designated as type X and type Y molecular sieves by the Linde Division of Union Carbide Corporation have silica to alumina ratios of about 2.5 to 6.0 and frequently require the addition of fine sized silica to the reaction mixture.

Broadly speaking, the preferred method of preparing these zeolites comprises mixing the reactants togther, aging the reaction mass for a predertermined period of time, followed by a hydrothermal conversion step. After the hydrothermal conversion is complete, the product is washed to remove excess reactants. It is preferable that the pH of aqueous slurry of the washed product be reduced to about 9.5 to 11.

Because the molecular sieves are made in an environment that requires an excess amount of alkali metal hydroxide, considerable washing is required to reduce the aqueous slurry pH to approximately 9.5 to 11. This washing step has caused a substantial amount of difficulty in plant processes. As the pH approaches the 9.5 to 11.0 range, the filter cake becomes very thixotropic because of the uniformly small particles of the zeolite product and reduction of the cations in the aqueous phase.

This is a major problem in plant processes for the production of the molecular sieves. Large quantities of water have been required in the washing of these materials due to the channelling nature of the washing patterns. In addition, the removal of water from the filter cake when a filter press is used in filtration requires an excessive period of time.

The use of acid materials to neutralize the excess sodium hydroxide in the reaction mass is impractical because acids are costly and it is extremely difficult to prevent local concentrations of even dilute acid solutions where pH would be so low to cause over-neutralization and destruction of the molecular sieve by the acidic conditions. In addition, the presence of residual extraneous alien ions such as the sulfate, nitrate or chloride ions may cause problems with further product processing. In addition, it is very difficult to find a material for the fabrication of the plant equipment needed for this process that is able to withstand the corrosive effects of both alkali metal hydroxides and acid environments in the same filter apparatus.

I have found that this difficulty can be overcome by the use of alkali metal bicarbonate as a washing medium. Sodium bicarbonate, the preferred reactant, behaves as an acid in a strong hydroxide environment. The sodium hydroxide reacts with the bicarbonate to form sodium carbonate and water. The minimum pH obtainable in a 2 percent bicarbonate solution is the same as that of the sodium bicarbonate, approximately 8.2. In addition, the problem of addition of extraneous ions does not exist since the only extraneous ion introduced is the carbonate ion which is evolved in the later processing steps, such as additional exchange steps or desiccant activation of the product. My novel process is particularly effective since time is very important in a commercial filtering operation if the productive capacity of the filters is to be maintained.

The molecular sieve slurry treated according to the process of my invention may be prepared by any of the processes described in the patent or technical literature. For example, the unwashed slurry may be in the form of a slurry prepared according to the process described in U.S. Patent 2,979,381, to Gottstein. The steps of this process include:

(1) Preparing a reactant mixture having the ratio reactants in the desired range, by adding all the raw materials to a mix tank at room temperature.

(2) Allowing the resulting mixture to equilibrate or digest at ambient temperature for at least about 3 hours.

(3) Heating the mixture to an elevated temperature and (4) Maintaining the reactant mixture at the elevated temperature until the zeolite X is crystallized. The equilibration or aging step is normally carried out at room temperature and the crystallization step at a temperature of about 212° F.

The slurry from the reactant mixture, the feed for our novel process, is filtered at a pH of at least 11.2 and a temperature of about 130 to 140° F. This material is transferred from the reaction vessel to the filtering apparatus. The transfer may be made with the slurry as recovered from the crystallization step or it may be diluted with water. This slurry is de-watered and the cake may be washed to remove a portion of the sodium hydroxide and sodium silicate. The water used in this wash is then removed and the filter cake washed with an aqueous alkali metal bicarbonate solution. Sodium bicarbonate solution is preferred. In practice, it may be used in a concentration as high as 2.5% sodium bicarbonate but satisfactory results are obtained with a sodium carbonate solution that contains as little as 0.25% by weight sodium bicarbonate. The washing is preferably carried out at temperatures from 55 to 150° F., preferably about 90° to 125° F. The wash solution is used in a quantity equal to 0.60 to 2 gallons, preferably 0.65 to 0.85 gallon of wash solution per pound of zeolite. After this wash, the excess water is removed and the product is recovered from the filter. A slurry of this product has a pH in the proper range and has the physical properties desired for later processing of the molecular sieve.

My invention is further illustrated by the following specific but non-limiting example.

EXAMPLE I

In this run, the improved results obtained using my novel process was demonstrated. A slurry of the type X zeolite was prepared and was filtered in a commercial unit. The filter used was a rotary drum filter, equipped for product washing, sold commercially by Dorr Oliver, Eimco or Filtration Engineers, Inc.

The pH of the slurry was 11.4 in each case. The slurry, as removed from the reaction tank, was at a temperature of 132° F. Three filter cakes were formed. The first cake was washed with water, the second cake with a 1% sodium bicarbonate solution and the third cake with a 2.5% sodium bicarbonate solution. The filtration was carried out at 37.5% submergence. The filter was operated at ½ revolution per minute. The filtering time was 44 seconds and the de-watering time was 6 seconds in each case. The slurries were washed for 32 seconds and second de-watering time was 10 seconds. The cake thickness in each case was ½ inch. The data collected in this series of runs is set out in the table below:

TABLE I

|  | I | II | III |
|---|---|---|---|
| pH of slurry | 11.4 | 11.4 | 11.4 |
| Temp. of slurry (° F.) | 132 | 132 | 132 |
| Filter cloth | 514 | 514 | 514 |
| Percent submergence | 37.5 | 37.5 | 37.5 |
| R.p.m. | ½ | ½ | ½ |
| Time, filtering (sec.) | 44 | 44 | 44 |
| Time, de-watering (sec.) | 6 | 6 | 6 |
| Time, washing (sec.) | 32 | 16–16 | 16–16 |
| Time, de-watering (sec.) | 10 | 10 | 10 |
| Time, before cake cracking (sec.) | 4 | | |
| Discharge from cloth | Soupy | (¹) | (¹) |
| Cake thickness (in.) | ½ | ½ | ½ |
| Temp. of wash water (° F.) | 176 | 130 | 130 |
| cc. of wash and filtrate | 1,440 | 1,190 | 1,140 |
| cc. of wash water | 780 | 440 | 470 |
| cc. of filtrate | 660 | 750 | 670 |
| Wet wt. of cake, g | 235 | 244 | 221 |
| Dry wt. of cake, g | 96 | 105 | 93 |
| Water removed | 139 | 139 | 128 |
| Percent water in cake | 59 | 57 | 57.5 |
| Dry wt., lbs./sq. ft./rev | 1.27 | 1.39 | 1.23 |
| Lbs./sq. ft./hr | 38.1 | 41.7 | 36.9 |
| Wt. wet cake edges | 75 | 75 | 75 |
| Lbs. wash water/lb. dry cake | | 3.21 | 3.73 |
| Cake pH | 10.7 | 9.0 | 9.3 |
| No. of wash displacements | 4.25 | 2.43 | 2.76 |

¹ Fairly firm.

(I) This test was the control cake; discharge was too soupy to be discharged by scraper or strings.

(II) The wash water was divided, 16 seconds of water (200 cc.) and 16 seconds of 2.5% $NaHCO_3$ wash (240 cc.). The cake was compression rolled after initial cake pick-up and prior to discharge. Cake easily discharged by scraper.

(III) The wash water was divided, 16 seconds of water (200 cc.) and 16 seconds of 1% $NaHCO_3$ wash (270 cc.). The cake was compression rolled after initial cake pick-up prior to discharge. Cake easily discharged by scraper.

The advantages of my process are obvious from a review of the data. The pH of the slurry after washing with water was 10.7 which indicates a decrease in pH of less than 1 pH unit. By contrast, the pH of the material washed with the 2.5% sodium bicarbonate solution, was 9.0 and the pH of the product washed with 1% sodium bicarbonate solution was 9.3.

Another advantage of the use of bicarbonate in the washing was demonstrated by the type of cake discharged from the filter cloth. The cake discharged from the filter cloth that had been water washed was too fluid to be discharged from the cloth by a scraper or strings. The filter cake that had been washed with bicarbonate solution was firm enough to be discharged from the filter cloth by either scraping or strings. In addition, it should be emphasized that the reduction in pH was achieved with slightly more than ½ the volume of wash solution when bicarbonate was used as compared with water.

Obviously many modifications and variations of the invention may be made without departing from the essence and scope thereof and only such limitations should be applied as are indicated in the appended claims.

What is claimed is:

1. In an improved method for removing excess alkaline reactants from an alkali metal hydroxide containing reaction mixture used to prepare silica alumina containing molecular sieves, said reaction mixture comprising a slurry of molecular sieve in an aqueous solution of alkali metal hydroxide, the improvement which comprises washing said slurry with an aqueous solution of an alkali metal bicarbonate, said solution containing from about 0.25 to about 2.5 percent by weight of said bicarbonate, at a temperature of from about 55 to about 150° F. until pH of said slurry is reduced to about 9.0.

2. The method of claim 1 wherein the alkali metal bicarbonate is sodium bicarbonate.

3. The method of claim 1 wherein said washing is conducted at a temperature of 90 to 125° F.

4. The method of claim 1 wherein said washing is carried out using 0.6 to about 2 gallons of said alkali metal bicarbonate solution per pound of molecular sieve slurry.

References Cited

UNITED STATES PATENTS 1,947,248   2/1934   Burks.
2,966,466  12/1960   Schwartz _____ 252—317

LEON D. ROSDOL, *Primary Examiner.*

S. D. SCHWARTZ, *Assistant Examiner.*